(12) United States Patent
Ritter et al.

(10) Patent No.: US 6,476,320 B1
(45) Date of Patent: Nov. 5, 2002

(54) INDICATING INSTRUMENT

(75) Inventors: Thomas Ritter, Alzenau; Manfred Zeiss, Rüsselsheim; Harald Ehmes, Hainburg, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/470,190

(22) Filed: Dec. 22, 1999

(30) Foreign Application Priority Data

Dec. 23, 1998 (DE) .......................................... 198 59 919

(51) Int. Cl.$^7$ ............................. H02G 3/04; B60K 35/00
(52) U.S. Cl. ........................ 174/66; 174/17 CT; 174/50; 174/17 R
(58) Field of Search ............................. 174/17 CT, 66, 174/67, 65, 255, 52.1, 17 R, 50; 361/752, 761, 792, 647, 800, 807, 23; 220/241, 3.8; 200/302.2, 302.1

(56) References Cited

U.S. PATENT DOCUMENTS

| | | | | |
|---|---|---|---|---|
| 4,560,083 A | * | 12/1985 | Danico | 220/307 |
| 4,874,906 A | * | 10/1989 | Shotey | 174/67 |
| 4,939,934 A | | 7/1990 | Ritzenthaler et al. | |
| 5,099,396 A | * | 3/1992 | Barz et al. | 174/35 R |
| 5,430,612 A | * | 7/1995 | Simon et al. | 174/17 R |
| 5,502,615 A | * | 3/1996 | Kubota et al. | 361/647 |
| 5,650,591 A | * | 7/1997 | Matsushita et al. | 174/17 CT |
| 5,942,728 A | * | 8/1999 | Chen | 174/65 R |
| 5,959,844 A | * | 9/1999 | Simon et al. | 361/759 |
| 6,025,820 A | * | 2/2000 | Salmon et al. | 345/75 |
| 6,129,406 A | * | 10/2000 | Dauvergue | 296/70 |
| 6,179,429 B1 | * | 1/2001 | Sheldon et al. | 362/26 |

FOREIGN PATENT DOCUMENTS

| | | |
|---|---|---|
| DE | 2515830 | 10/1976 |
| DE | 7727618 | 2/1978 |
| DE | 3101519 | 10/1982 |
| DE | 4227579 | 2/1994 |
| DE | 29516383 | 12/1995 |
| EP | 0600152 | 6/1994 |
| FR | 9376863 | 8/1948 |

OTHER PUBLICATIONS www.Britannica.com, Acylic polymers, No Date (properties of these materials are well known in the art prior to Dec. 23, 1998).*
www.Britannica.com, Carbon–chain polymers, No Date (properties of these materials are well known in the art prior to Dec. 23, 1998).*
Patent Abstracts of Japan vol. 1996, No. 02, Feb. 29, 1996, & JP 07 286866 A (Yazaki Corp) Oct. 31, 1995.

* cited by examiner

Primary Examiner—Dean A. Reichard
Assistant Examiner—Angel R. Estrada
(74) Attorney, Agent, or Firm—Martin A. Farber

(57) ABSTRACT

An invention relates to an indicating instrument, in particular for a motor vehicle, having a housing with a front frame holding a cover pane, and an elastic spacing element arranged between the cover pane and front frame, and a method for connecting the cover pane to the front frame. In order to ensure a reliable connection between the cover pane and front frame which is without play, the spacing element be is placed in an axial cutout which is arranged in the region of the circumference of the front frame and faces the cover pane, and in which the cover pane can engage. The method consists in that in a first step the spacing element is inserted into the axial cutout in the front frame, and in a second step the cover pane is pressed into the axial cutout against the spacing element.

4 Claims, 3 Drawing Sheets

INDICATING INSTRUMENT

FIELD AND BACKGROUND OF THE INVENTION

The invention relates to an indicating instrument, in particular for a motor vehicle, having a housing with a front frame holding a cover pane, and an elastic spacing element arranged between the cover pane and front frame. The invention also relates to a method for connecting a cover plate to a front frame of such an indicating instrument.

Such an indicating instrument is known, a cover pane engaging in a radial cutout, forming an axial recess, in an instrument housing, and in this case bracing a sealing ring likewise arranged in the radial cutout. The cover pane must be cambered for mounting, and a special mounting tool is required for inserting the pane into the housing. This assembly is expensive and complicated, as a result of which it is virtually impossible to automate the production. Moreover, the choice of material for the cover pane is fixed to the greatest possible extent, since the latter must have at least slight intrinsic elasticity, and there is the risk of damaging the pane during installation.

Moreover, indicating instruments are known in which the cover glasses are each welded to the front frame. This is an expensive production method which, in addition, can be applied only to a few pairs of materials. It is also known for the cover pane and front frame to be clipped. These clip connections are affected by play as a result of which noise is continuously developed in the event of flexing of the indicating instrument such as occurs regularly, in particular in motor vehicles, through persistent vibrational excitation. Moreover, in the case of these connections dust penetrates into the indicating instrument, as a result of which both the legibility of the instrument can be worsened and its operating reliability is reduced.

SUMMARY OF THE INVENTION

It is therefore the object of the invention to create an indicating instrument of the type mentioned at the beginning which on the one hand at least largely excludes penetration of pollutants into the instrument, and on the other hand ensures a permanent connection, without play, between the cover pane and front frame. Moreover, it is to be possible to produce the indicating instrument in a particularly simple and cost-effective fashion in large batch numbers. Moreover, the aim is to develop a method for simplified connection of a cover pane to a front frame of such an indicating instrument.

The first-named object is achieved according to the invention wherein the spacing element is placed in an axial cutout which is arranged in the region of the circumference of the front frame and faces the cover pane, and in which the cover pane can engage. Such a design ensures that the cover pane bears securely against the front frame without a relative movement of the components with respect to one another, for example excited by external vibrations, causing the elements to slide on one another, thus excluding undesired noise development. Moreover, it is possible in a simple way with the aid of the indicating instrument according to the invention to even out between the cover pane and front frame manufacturing tolerances which can reach a substantial dimension, particularly in the case of large-area indicating instruments. In addition, together with the axial cutout the spacing element permits optical concealment of the connecting region between the cover pane and front frame; it is possible to eliminate an additional cover for this, and the complete circumference of the indicating instrument can be directly visible to a viewer in a fashion which reduces the installation space of the indicating instrument. Because the cover pane can engage in the axial cutout, the indicating instrument according to the invention is particularly simple to mount, since the cover pane can be directly connected to the front frame from the front without being tilted or cambered.

It is conceivable that the axial cutout is arranged only in sections in the region of the circumference of the front frame. However, a particularly tight and homogenous connection between the cover pane and front frame is permitted when, in accordance with an advantageous development of the invention, the axial cutout in the region of the circumference of the front frame runs continuously around the latter. As a result, the operation of joining the cover pane and front frame is also simplified at the same time.

In accordance with another advantageous development of the invention, the axial cutout has a groove-shaped cross section such that on the one hand an exact position of the cover pane with respect to the front frame is ensured, and on the other hand the groove base can form an axial stop in a simple way when the cover pane and front frame are joined. Both the joining operation and the insertion of the spacing element into the axial cutout are advantageously substantially simplified when the groove has flanks diverging toward the cover pane.

A particularly reliable fixing of the spacing element on the front frame can be achieved when, in accordance with another advantageous development of the invention, the groove base of the axial cutout has an indentation pointing away from the cover pane, in which the spacing element can be held.

It would be possible, for example, to imagine that the spacing element is a rubber element and can be laid in the axial cutout in the front frame. By contrast, the spacing element can be arranged in a particularly simple way on the front frame when it advantageously consists of a hard-setting material. In addition, adaptation to the part of the cover pane engaging in the axial cutout can be performed in this case during hardening.

In accordance with another advantageous development of the invention, a particularly simple and reliable connection between the cover pane and front frame is achieved when the spacing element has an adhesive. The spacing element thus simultaneously fulfills the functions of sealing the instrument, connecting the cover pane to the front frame and mechanically decoupling and damping these components.

It is basically the case that the most varied materials, which advantageously simplify the processing and installation of the spacing element, for example thermoplastic elastomers, are suitable for the spacing element. However, it is particularly advantageous when the spacing element preferably consists of a polymer foam. This material flows easily even under a slight pressure in the case of conventional processing temperatures, and sets hard without volatile byproducts. Moreover, virtually no shrinkage occurs during the hard-setting, with the result that the spacing element is dimensionally correct and not prone to stress cracking.

In accordance with another advantageous development of the invention, the spacing element can be clamped between the front frame and cover pane so that, as a result of the clamping force, it ensures a sealing connection and reliable decoupling of the front frame and cover pane over the entire service life of the indicating instrument.

It is conceivable for the front frame and the cover pane to be screwed together or merely interconnected by means of an adhesive. The indicating instrument is, by contrast, particularly durable even under vibrating stress such as occurs in motor vehicles, and it can also be mounted very simply when the front frame and the cover pane can advantageously be interconnected by means of a clip device. In this case, a particularly reliable connection is ensured when arranged at a mutual spacing in the region of the circumference of the cover pane are at least two clips which can engage in corresponding clip lugs arranged on the front frame. A particularly high pressure can advantageously be exerted on the spacing element when the clip device is arranged in the region of the spacing element. In order in this case to maintain the full functionality of the spacing element, it is particularly advantageous when, in accordance with another development of the invention, the spacing element has indentations or cutouts through which the clips can engage.

In accordance with another advantageous development of the invention, in the region of its circumference the cover pane has a web pointing to the front frame approximately in the axial direction of the indicating instrument. This web can be arranged in sections, but it is especially advantageous for a particularly tight connection between the cover pane and front frame if the web runs continuously around the cover pane in the region of its circumference. The web could, for example, serve merely as a joining aid. However, it is particularly advantageous if the web can be put against the spacing element, and can thus simultaneously support the connection between the cover pane and front frame and exert a clamping force on the spacing element. The transitional, and thus damping and sealing surface between the cover pane and front frame is particularly large if, in accordance with another advantageous development of the invention, the web can engage in the spacing element.

Because of the simple assembly, rendered possible by the invention, of the cover pane and front frame by axially joining these two components and decoupling them fully mechanically, as a result of which their connection can be maintained in simple, stress-free fashion, a very wide range of materials can be used for the cover pane and the front frame. However, because of good optical properties, which are to be seen in a high degree of transparency and an excellent surface quality, it is particularly advantageous if the cover pane consists of a material having polymethyl methacrylate (PMMA). This excludes the possibility of poor optical quality of the cover pane, and thus defective legibility of the indicating instrument, posing a risk to traffic safety. The front frame can be produced in a particularly simple and cost-effective fashion when it preferably consists of a material having polypropylene (PP).

The second-named object, specifically creating a method for simplified connection between a cover pane and a front frame of an indicating instrument according to the invention, is achieved according to the invention by virtue of the fact that in a first step the spacing element is inserted into the axial cutout in the front frame, and in a second step the cover pane is pressed into the axial cutout against the spacing element. This method advantageously requires no manual dexterity; it easily renders possible a high degree of automation in production, it being possible at the same time to produce very high batch numbers per unit of time. The spacing element can be positioned with precision in a very simple way according to the insertion of the spacing element into the axial cutout. Pressing the cover pane into the axial cutout constitutes a simple joining operation on one axis.

The spacing element preferably consists of a material which flows when being inserted into the axial cutout, and is injected into the axial cutout. Thus, it is possible in a particularly simple way to insert the spacing element into the axial cutout with the aid of an injection nozzle, which can easily be positioned opposite the axial cutout, without an additional joining operation. It would be conceivable for the spacing element to remain in a viscose state after the insertion of the cover pane. However, a particularly firm and lasting connection between the cover pane and front frame results when the spacing element advantageously sets hard after the assembly of the front frame and cover pane.

For example, a bonded connection is adequate enough for holding the cover pane on the front frame. In accordance with another development of the invention, however, it is particularly advantageous if the front frame and the cover pane are clipped to one another. Owing to the clipped connection, it is additionally possible permanently to exercise a clamping force on the spacing element, with the result that it can position the front frame and cover pane relative to one another with prestressing.

BRIEF DESCRIPTION OF THE DRAWINGS

The invention can be carried out in very different ways. It is explained in more detail below with the aid of exemplary embodiments represented in the attached figures of the drawings in which.

DETAILED DESCRIPTION OF THE PREFERRED EMBODIMENT

Figure 1:
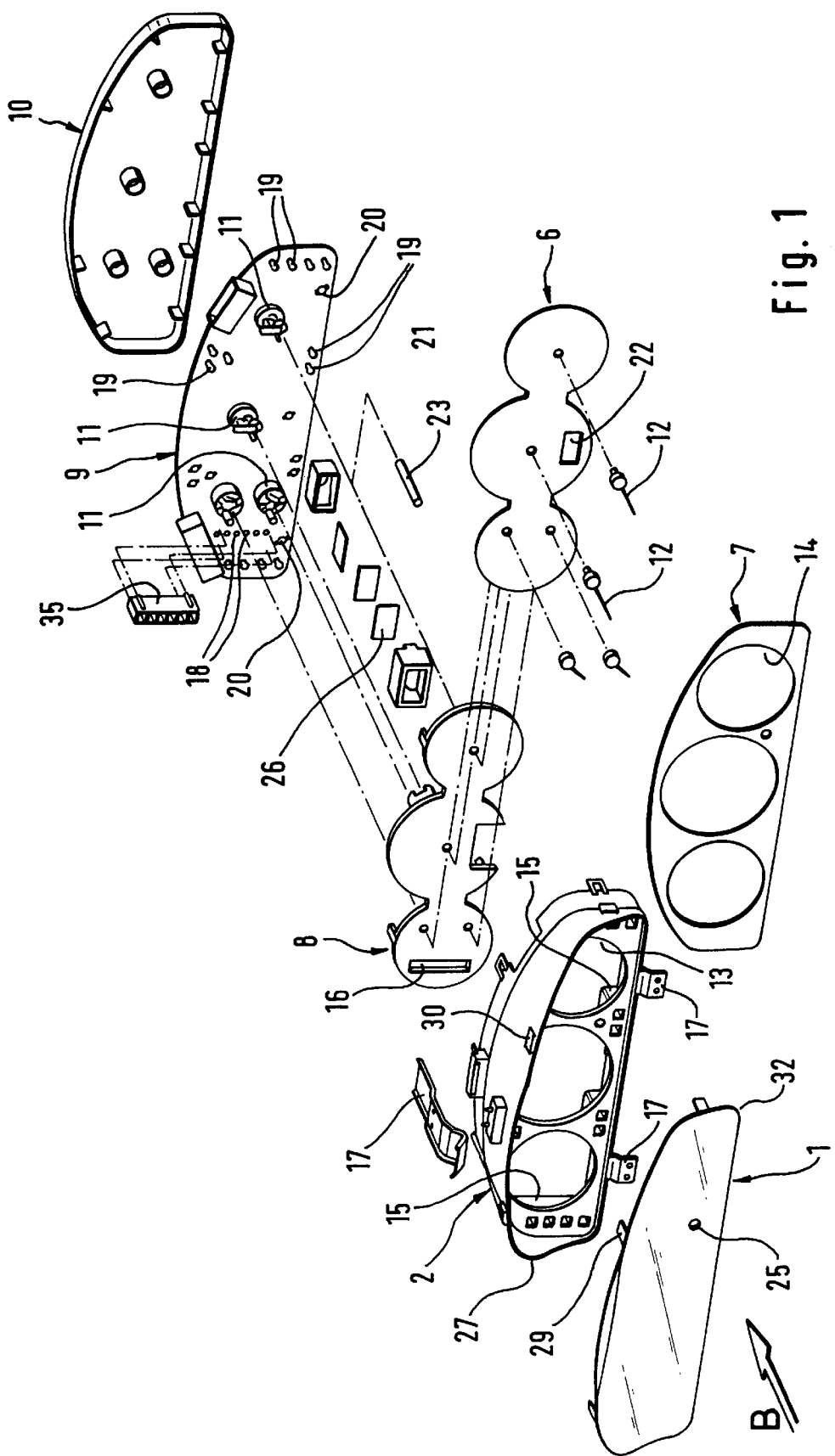
FIG. 1 shows an indicating instrument in an exploded representation.

Represented before mounting in FIG. 1 is an indicating instrument according to the invention having a front frame 2, a printed circuit board 9 and a rear wall 10. A cover pane 1 can be clipped on the front side of the front frame 2. A plurality of measuring elements 11, pilot lamps 19 and incandescent lamps 20 are arranged on the printed circuit board 9. The measuring elements 11 serve to drive pointers 12 which, in the mounted state of the indicating instrument, can pivot over a dial 6. The dial 6 is made from a translucent material and provided for fastening on an optical conductor plate 8 which can be illuminated by the incandescent lamps 20. Together with the pointers 12 and the dial 6, the measuring elements 11 respectively form an indicating unit which when combined with further indicating units form the indicating instrument also denoted as a instrument cluster. Such instrument clusters are preferably used in motor vehicles and are usually installed there in the dashboard.

The front frame 2 has a plurality of cutouts 13 for the indicating units, and is constructed in one piece with light shafts 15 for the pilot lights 19. The front side of the front frame 2 serves for fastening a cover 7. In a fashion corresponding to the cutouts 13 of the front frame 2, this cover 7 has cutouts 14 for the indicating units, and covers the light shafts 15 in the mounted state. Furthermore, the front frame 2 has a plurality of holding parts 17 for fastening the instrument cluster in the dashboard of the motor vehicle. The instrument cluster is connected electrically to the vehicle electronics by means of plug-in contacts arranged on the printed circuit board 9.

The dial 6 and the printed circuit board 8 in each case have a cutout 22 for a flat display screen 26 to be arranged on the printed circuit board 9. An incandescent lamp 21 is provided on the printed circuit board 9 for the purpose of illuminating the flat display screen 26. The optical conductor plate 8 has a further cutout 16, through which additional information can be represented on the dial 6 by a series of light-emitting diodes 18 arranged on the printed circuit board 9. Light shafts 35 required for this purpose are provided for mounting on the printed circuit board 9. One cutout 25 present in the front frame 2 and the cover frame 1 serves the purpose of guiding through an operating element 23 for resetting a trip meter.

The previously described individual parts of the indicating instrument are assembled essentially in the axial direction B of the indicating instrument. In order to connect the cover pane 1 to the front frame 2, in the region of its circumference 32 the cover pane 1 has clips 29, and in the region of its circumference 27 the front frame 2 has clip lugs 30 corresponding to the clips 29. The clips 29 can engage in the clip lugs 30.

Figure 2:
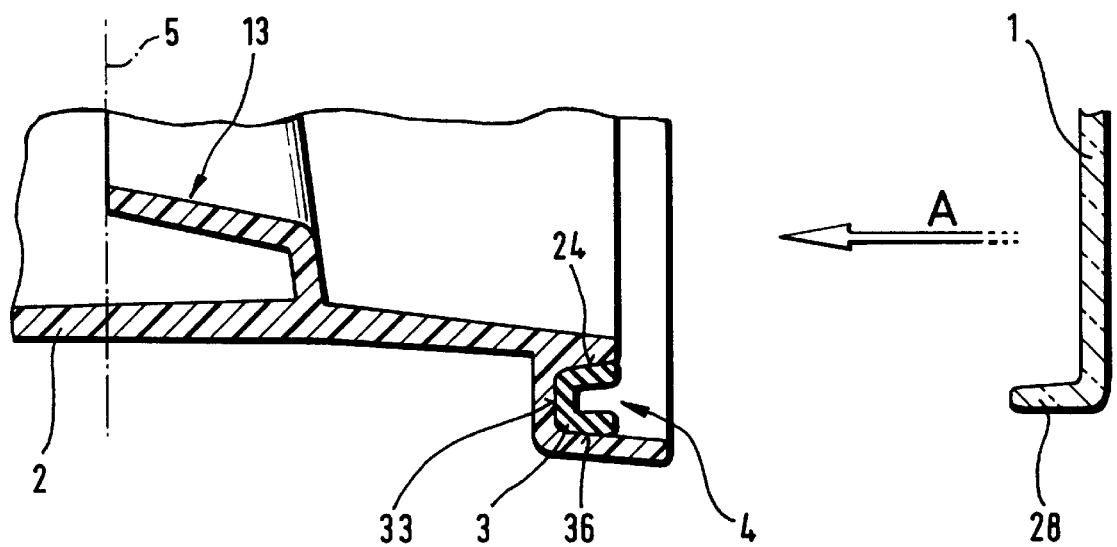
FIGS. 2, 3 show a section of a front frame and of a cover pane in a first embodiment.
Figure 3:
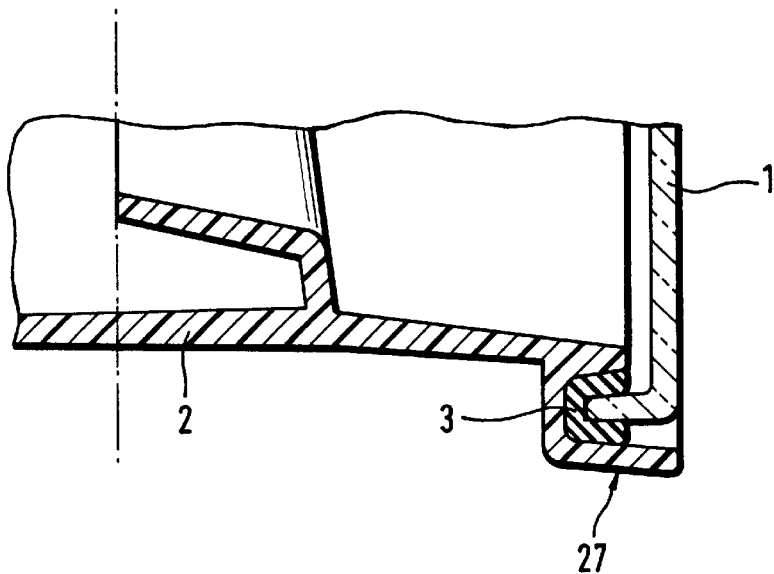

In order to explain the connection of the front frame 2 and the cover pane 1, a section of the edge region of a front frame 2 and a cover pane 1 is represented enlarged in FIGS. 2, 3 in an alternative embodiment, a plane 5 in which a dial is to be arranged, and a cutout 13 in the front frame 2 for an indicating unit being illustrated for the purpose of explaining the position of the section. FIG. 2 shows the two components before they are assembled in the illustrated joining direction A, which corresponds approximately to the axial direction B of the indicating instrument (FIG. 1). FIG. 3 shows the assembled state. It is to be seen that an axial cutout 4 facing the cover pane 1 is arranged in the region of the circumference 27 of the front frame 2. An elastic spacing element 3 having an approximately U-shaped cross section is inserted into this axial cutout 4, running continuously around the front frame 2 in the region of the circumference 27 thereof. The axial cutout 4 is constructed in this case in the shape of a groove, and the spacing element 3 bears directly against its groove base 33 and the groove flanks 24, 36. A web 28 running around the circumference of the cover pane 1 can engage in the spacing element 3.

Figure 4:
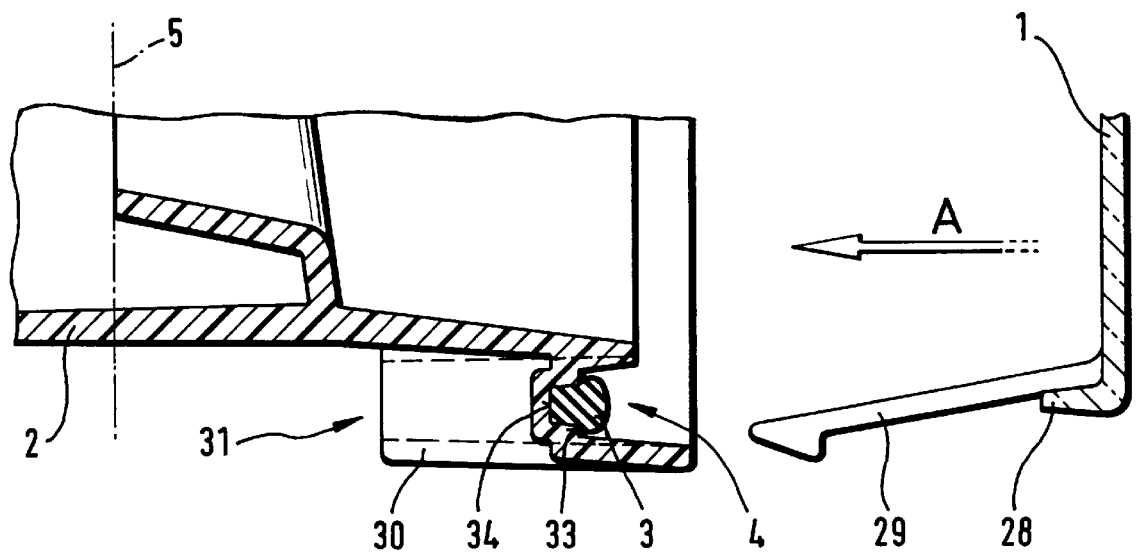
FIGS. 4, 5 show a section of front frame and a cover pane in a second embodiment.
Figure 5:
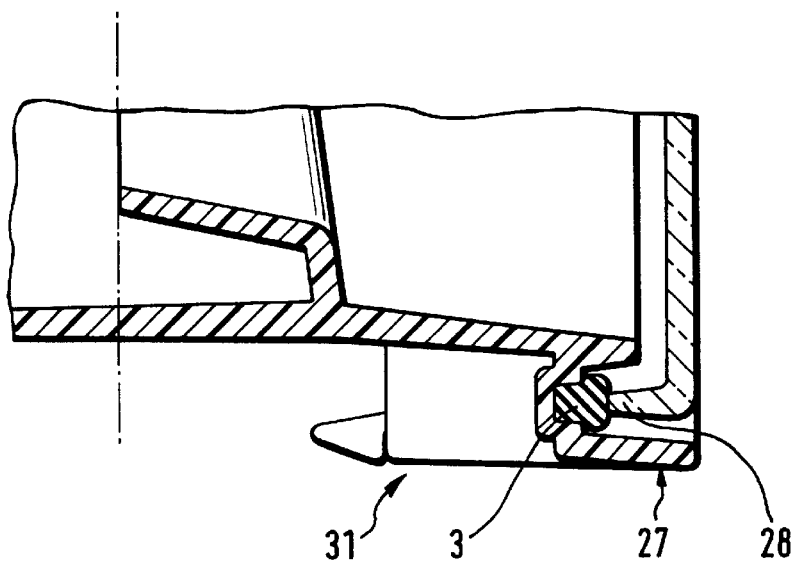

A similar section of a circumferential region of a front frame 2 and a cover pane 1 is shown in FIGS. 4, 5 in an embodiment corresponding to FIG. 1. Here, as well, a dial plane 5 is illustrated for the purpose of explaining the position of the section. Arranged in the region of the circumference 27 of the front frame 2 is a groove-shaped axial cutout 4 running around continuously. Injected, as spacing element 3, into the axial cutout 4, whose groove base 33 has an indentation 34 pointing away from the cover pane 1 is a polyester foam which sets hard after the injection operation and remains in an elastic state. Clip lugs 30 arranged on the circumference 27 of the front frame 2 hold clips 29 correspondingly fitted on the circumference of the cover pane 1. Pressing onto the spacing element 3, which has set hard, in the assembled state is a web 28 of the cover pane 1 which braces the spacing element 3 against the groove base 33 and the indentation 34 in the axial cutout 4 after latching in the joining direction A of the clip device 31 comprising the clip 29 and clip lug 30.

What is claimed is:

1. An indicating instrument, in particular for a motor vehicle, having a housing with a front frame holding a cover pane, and an elastic spacing element arranged between the cover pane and front frame, wherein the spacing element (3) is placed in an axial cutout (4) which is arranged in a region of circumference (27) of the front frame (2) and faces the cover pane (1), and in which the cover pane (1) is engageable, wherein the axial cutout (4) has a groove-shaped section, and wherein a groove base (33) of the axial cutout (4) has an indentation (34) extending in a direction away from the cover pane (1).

2. A method for connecting a cover pane to a front frame of an indicating instrument, the indicating instrument comprising a housing with a front frame holding a cover pane, and an elastic spacing element arranged between the cover pane and front frame, an axial cutout (4) disposed in a region of circumference (27) of the front frame (2) and facing the cover pane (1) for engagement with the cover pane (1), wherein the spacing element is located in the axial cutout;

the method comprising steps of inserting the spacing element into the axial cutout (4) in the front frame (2), and pressing the cover pane (1) into the axial cutout (4) against the spacing element (3), and wherein the spacing element (3) comprises a material which flows when being inserted into the axial cutout (4), and is injected into the axial cutout (4).

3. The method as claimed in claim 2, wherein the spacing element (3) sets hard after assembly of the front frame (2) and cover pane (1).

4. The method as claimed in claim 2, wherein the front frame (2) and the cover pane (1) are clipped to one another.

* * * * *